Figure 1:
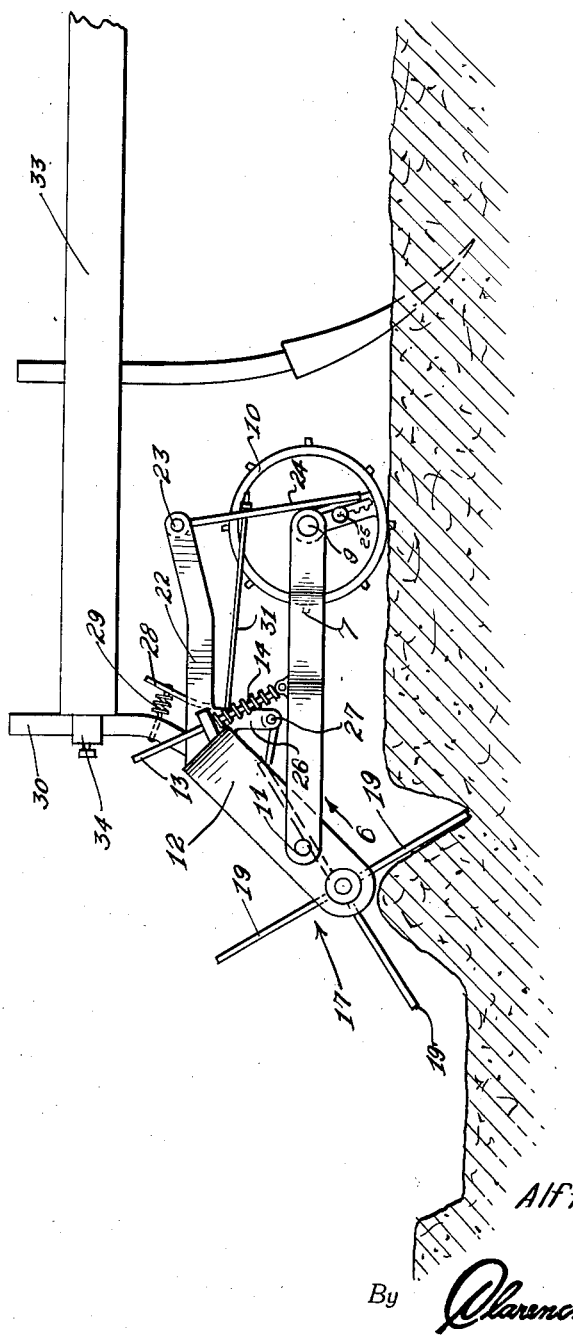

April 1, 1941.  A. NIELSEN  2,236,832
CULTIVATOR DAMMER
Filed Aug. 31, 1940   2 Sheets-Sheet 1

Inventor
Alfred Nielsen

By Clarence A. O'Brien
Attorney

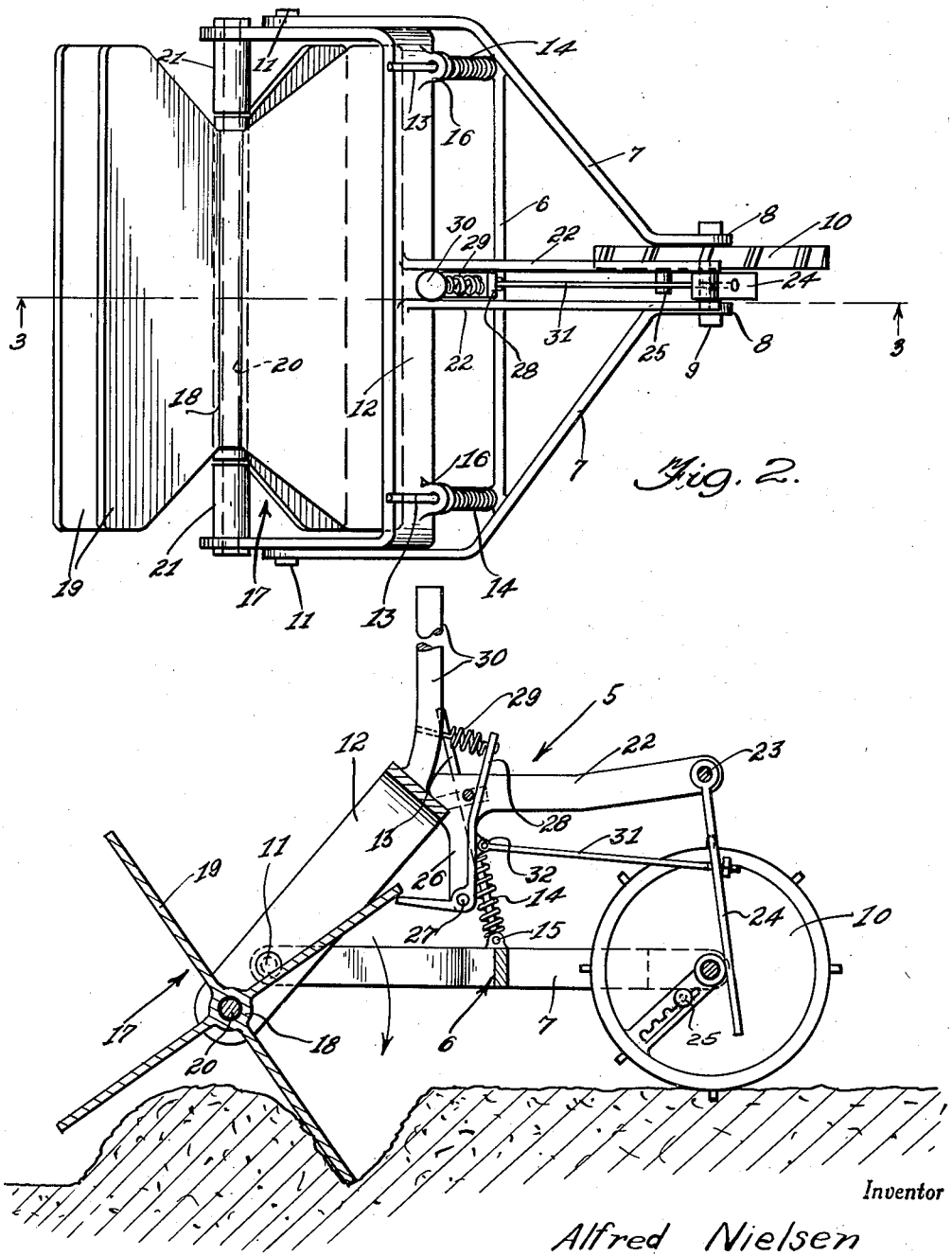

Patented Apr. 1, 1941

2,236,832

UNITED STATES PATENT OFFICE 2,236,832

CULTIVATOR DAMMER

Alfred Nielsen, Defiance, Iowa

Application August 31, 1940, Serial No. 355,048

4 Claims. (Cl. 97—55)

The present invention relates to agricultural tools, and more particularly to a device or a machine known generally in the art as a "dammer," the object, intent and purpose of the same being to facilitate the constructing or making of dirt hills or dams for obstructing the flow of water and moisture between the rows of plants.

An object of the present invention is to provide a device or machine of this character which may be readily coupled to the cultivator in the place and stead of the rear shovel thereof whereby the damming operation may be performed incidental to the cultivating of the land.

The invention, together with its objects and advantages will be best understood from a study of the following description taken in connection with the accompanying drawings, wherein—

Figure 1 is a side elevational view illustrating the application of the invention, Figure 2 is a top plan view thereof, and Figure 3 is a sectional view taken substantially on the line 3—3 of Figure 2.

Referring more in detail to the drawings, it will be seen that the dammer, indicated generally by the reference numeral 5 embodies a substantially U-shaped frame 6 from the closed end of which extends forwardly integral arms 7 that terminate in parallel coextensive bearings 8—8. The bearings 8 support an axle 9 upon which a lugged-traction wheel 10 is mounted.

Pivoted to the legs of the frame 6 at the free ends of said legs, and as indicated at 11 are the legs of a substantially U-shaped frame 12 that at the closed end thereof is supported, resiliently, and at a suitable angle to the vertical through the medium of rods 13 and springs 14.

The rods 13 are pivoted at one end thereof as at 15 to the frame 6 at the closed end of the frame and are trained through apertured lugs 16 provided on the closed end of the frame 12. The springs 14 are disposed about the rods 13 and at one end thereof impinge on the frame 6 as shown, and at an opposite end thereof impinge against the lugs 16 as shown.

Carried by the frame 12 at the open end of the latter is a rotor indicated generally by the reference numeral 17.

The rotor 17 embodies a hub 18 having radiating therefrom a plurality of blades, in the present instance four, and indicated by the reference numeral 19.

The rotor 17 is rotatable about an axle 20 the ends of which are journalled in suitable bearings 21 provided therefor on the free ends of the legs of frame 12 as shown.

Extending forwardly from the closed end of the frame 12 are spaced parallel coextensive bars or arms 22. Pivoted between the arms 22 at the free ends of the latter and as indicated generally at 23 is one end of a trip arm 24. The trip arm 24 is adapted to be engaged by a stud 25 mounted on the body of a wheel 10 as shown for adjustment on the body of the wheel radially with respect to the axis of the wheel. Obviously by positioning the stud 25 at the desired position of adjustment a timing of the contact of the trip arm with the stud may be varied at the will of the operator and as the spacing of the dams may require.

The arms 22 are provided with depending extensions 26 between which is pivoted as at 27 a latch 28. The latch 28 has one end thereof normally projected into the path of the blades 19 through the medium of a coil spring 29 that is anchored at one end thereof to a tang 30 rising from the closed end of the frame 12 and at an opposite end thereof to the free end of the latch 28.

The latch 28 and trip lever 24 are operatively connected together through the medium of a nut equipped bolt or rod 31, one end of which is pivoted to the trigger 28 as at 32.

In Figure 1 is shown fragmentarily a beam 33 of a cultivator, and the latter at the rear end thereof is suitably equipped as at 34 to complement the tang 30 of the dammer 5 whereby said dammer may be readily attached to the cultivator to trail the same; the dammer 5 being positioned in the place and stead of the usual cultivator shovel.

The manner of operation and the function of the dammer is believed to be apparent to those skilled in the art but may be briefly explained as follows:

Normally a blade 19 is engaged by the latch member 28 thereby retarding rotation of the rotor 17 in the operating direction indicated by the arrow in Figure 3. However, as the device moves over the ground, stud 25 moves into engagement with the trip lever 24, forcing the latter to swing in a counterclockwise direction on its pivot 23. This swinging movement of the trip lever 24 is transmitted through the rod 31 to the latch 28 causing the latter to swing on its pivot 27 in a direction to cause the free end of the latch to clear the blade 19, thus permitting the rotor 17 to rotate approximately one-fourth of a revolution.

Manifestly, with the rotor 17 releasably locked against rotation, one of the blades will function to scrape the dirt into a hill for forming a dam, sufficient dirt having been scraped to accomplish that purpose at about the time the stud 25 comes into engagement with the trip lever 24 for releasing the rotor. When the fraction of the revolution of the rotor has taken place the rotor is again locked against rotation so that the dam forming operation just explained is repeated.

It is thought that a clear understanding of the construction, utility, manner of use and advantages of a machine embodying the features of the present invention will be had without a more detailed description thereof.

It is also to be understood that while I have herein shown and described the preferred embodiment of the invention, it is in nowise intended to restrict the invention to the precise details of construction, combination and arrangement of elements as herein illustrated, other than as may be required by the prior art and scope of the appended claims.

Having thus described the invention, what is claimed as new is:

1. In an agricultural machine of the class described, a frame, a ground engaging wheel journalled in the frame at one end thereof, a member pivotally mounted on the frame and resiliently supported thereon normally at an angle to the vertical, a rotor supported on said pivoted member and embodying a plurality of circumferentially spaced dam forming blades, a spring biased latch member pivoted on said frame and having its end arranged in the path of said blade for normally locking the rotor against rotating movement in one direction, a trip lever pivotally mounted on said frame, a stud on said wheel and engageable with said trip lever for causing the latter to swing on its pivot, and an operating connection between said trip lever and said latch for transmitting swinging movement of the lever to the latch.

2. In a dam forming machine for agricultural purposes, a substantially U-shaped frame having arms extending forwardly from the closed end of the frame and converging at their free extremities, a ground engaging wheel rotatably supported between the extremities of said arms, a member pivotally mounted on the frame, said member provided with apertured lugs, rods pivoted to the frame and having end portions trained through the apertures in said lugs, coil springs disposed about said rods and impinging at one end against said frame and at an opposite end against said lugs, a rotor rotatably supported on said pivoted member, said rotor having a plurality of equidistantly spaced blades radiating therefrom, latch means mounted on said frame and coacting with said blades for yieldably retaining said rotor against rotation in one direction, and coacting means on said frame and on said wheel and connected with said latch means for tripping said latch means at intervals to free said rotor.

3. In a cultivator dammer, a wheel supported frame structure equipped for attachment to the rear of a cultivator, a dam forming rotor rotatably mounted on said frame and embodying a plurality of circumferentially spaced blades, latch means normally retaining said rotor against rotation in one direction, and means mounted on said frame and connected with said latch means for releasing at predetermined intervals, the latter as the dammer moves over the ground, as and for the purpose specified.

4. In a cultivator dammer, a wheel supported frame structure equipped for attachment to the rear of a cultivator, a dam forming rotor rotatably mounted on said frame and embodying a plurality of circumferentially spaced blades, latch means normally retaining said rotor against rotation in one direction, and means adjustably mounted on the supporting wheel of the frame and coacting with said latch means for releasing the latter at intervals as the dammer moves over the ground.

ALFRED NIELSEN.